United States Patent [19]

DeNicola, Jr. et al.

[11] Patent Number: 5,863,994
[45] Date of Patent: Jan. 26, 1999

[54] USING NITRIC OXIDE TO REDUCE REACTOR FOULING DURING POLYPROPYLENE GRAFT COPOLYMERIZATION

[75] Inventors: Anthony J. DeNicola, Jr., Newark; Cheng Q. Song, Wilmington, both of Del.

[73] Assignee: Montell North America Inc., Wilmington, Del.

[21] Appl. No.: 939,237

[22] Filed: Sep. 29, 1997

[51] Int. Cl.[6] .................................................. C08F 2/02
[52] U.S. Cl. ......................... 526/74; 525/244; 524/457
[58] Field of Search ............................. 526/74; 525/243, 525/244, 260, 263, 264, 284, 293, 302, 310, 311, 387; 524/457

[56] References Cited

U.S. PATENT DOCUMENTS

| | | | |
|---|---|---|---|
| 3,964,979 | 6/1976 | Watson | 203/9 |
| 4,070,419 | 1/1978 | Watson | 260/879 |
| 4,341,600 | 7/1982 | Watson | 203/9 |
| 4,483,965 | 11/1984 | Ohba et al. | 525/322 |
| 4,754,058 | 6/1988 | Levy | 560/205 |
| 5,140,074 | 8/1992 | DeNicola et al. | 525/263 |
| 5,283,287 | 2/1994 | Kim et al. | 525/86 |
| 5,411,994 | 5/1995 | Galli et al. | 521/50.5 |
| 5,589,541 | 12/1996 | Kinoshita et al. | 525/66 |

FOREIGN PATENT DOCUMENTS 209900  9/1981  Hungary.

*Primary Examiner*—Robert Dawson
*Assistant Examiner*—D. Aylward

[57] ABSTRACT

A graft copolymer comprising a backbone of a propylene polymer material having a vinyl monomer graft polymerized thereto is produced by (1) treating a propylene polymer material with a free radical polymerization initiator, (2) treating the propylene polymer material with at least one grafting monomer capable of being polymerized by free radicals, and (3) removing any unreacted grafting monomer from the graft copolymerized propylene polymer material, decomposing any unreacted initiator, and deactivating any residual free radicals in the material, wherein (1) and (2) are carried out in the presence of a continuous feed of nitric oxide. The nitric oxide reduces the build-up of polymer deposits on reactor walls and gas circulation loops while having almost no effect on the graft copolymerization reaction.

6 Claims, No Drawings

USING NITRIC OXIDE TO REDUCE REACTOR FOULING DURING POLYPROPYLENE GRAFT COPOLYMERIZATION

FIELD OF THE INVENTION

This invention relates to a process for the graft copolymerization of propylene polymer materials.

BACKGROUND OF THE INVENTION

Reactor fouling in graft copolymerization of propylene polymer materials with styrenic and other vinyl monomers occurs in both semi-batch stirred tank reactors and in gas mixed loop reactors. The polymer deposits that are formed on the reactor walls and gas circulation loops usually grow rapidly after an initial deposit. Severe reactor fouling would affect the product quality, productivity, and operability of a commercial plant.

Since the main reaction is a free radical polymerization using a peroxide as an initiator, any attempt to reduce reactor fouling by using a monomer-soluble free radical scavenger will potentially interfere with the graft polymerization process. Therefore such soluble scavengers are preferably not used in this process.

It is known that polymerization inhibitors such as nitric oxide can be used to prevent polymerization of vinyl aromatic compounds during distillation, for example, as disclosed in U.S. Pat. No. 3,964,979. U.S. Pat. No. 4,070,419 discloses adding gaseous NO, e.g., during purification of styrene by distillation, and then subjecting the monomer to polymerization conditions, whereby the styrene polymerized at an accelerated rate. Hungarian Patent 77-MA2891 discloses grafting irradiated polypropylene with styrene in the presence of a nitroxyl polymerization inhibitor to reduce side reactions, i.e., no polystyrene by-product was formed. U.S. Pat. No. 5,283,287 discloses a process for making a thermoplastic resin composition having excellent HCFC resistance which includes graft polymerizing a monomer mixture of a vinyl cyanide, a vinyl aromatic compound, and an unsaturated carboxylic acid or ester thereof in the presence of a rubber latex and a polymerization inhibitor such as nitric oxide to control the sequence of polyacrylonitrile units. However, none of these references discloses the use of a continuous feed of nitric oxide to reduce reactor fouling during the production of polypropylene graft copolymers.

SUMMARY OF THE INVENTION

The process of this invention for making a graft copolymer comprises, in a substantially non-oxidizing environment:

(a) treating a propylene polymer material with an organic compound that is a free radical polymerization initiator;

(b) treating the propylene polymer material over a period of time that coincides with or follows (a), with or without overlap, with about 5 to about 240 parts of at least one grafting monomer capable of being polymerized by free radicals, per hundred parts of the propylene polymer material; and (c) removing any unreacted grafting monomer from the resulting grafted propylene polymer material, decomposing any unreacted initiator, and deactivating any residual free radicals in the material, wherein (a) and (b) are carried out in the presence of nitric oxide that is added in an inert gas in an amount of about 0.05 parts to about 50 parts of nitric oxide per million parts of the inert gas to reduce reactor fouling.

The continuous feed of nitric oxide significantly reduces the degree of reactor fouling while having almost no effect on % conversion of monomer to polymer or grafting efficiency.

DETAILED DESCRIPTION OF THE INVENTION

The propylene polymer material that is used as the backbone of the graft copolymer can be:

(a) a crystalline homopolymer of propylene having an isotactic index greater than 80, preferably about 85 to about 99;

(b) a crystalline random copolymer of propylene and an olefin selected from the group consisting of ethylene and $C_4-C_{10}$ α-olefins, provided that when the olefin is ethylene, the maximum polymerized ethylene content is 10% by weight, preferably about 4%, and when the olefin is a $C_4-C_{10}$ α-olefin, the maximum polymerized content thereof is 20% by weight, preferably about 16%, the copolymer having an isotactic index greater than 85;

(c) a crystalline random terpolymer of propylene and two olefins selected from the group consisting of ethylene and $C_4-C_8$ α-olefins, provided that the maximum polymerized $C_4-C_8$ α-olefin content is 20% by weight, preferably about 16%, and, when ethylene is one of the olefins, the maximum polymerized ethylene content is 5% by weight, preferably about 4%, the terpolymer having an isotactic index greater than 85;

(d) an olefin polymer composition comprising:
  (i) about 10 parts to about 60 parts by weight, preferably about 15 parts to about 55 parts, of a crystalline propylene homopolymer having an isotactic index greater than 80, preferably about 85 to about 98, or a crystalline copolymer selected from the group consisting of (a) propylene and ethylene, (b) propylene, ethylene and a $C_4-C_8$ α-olefin, and (c) propylene and a $C_4-C_8$ α-olefin, the copolymer having a propylene content of more than 85% by weight, preferably about 90% to about 99%, and an isotactic index greater than 85;
  (ii) about 5 parts to about 25 parts by weight, preferably about 5 parts to about 20 parts, of a copolymer of ethylene and propylene or a $C_4-C_8$ α-olefin that is insoluble in xylene at ambient temperature; and
  (iii) about 30 parts to about 70 parts by weight, preferably about 20 parts to about 65 parts, of an elastomeric copolymer selected from the group consisting of (a) ethylene and propylene, (b) ethylene, propylene, and a $C_4-C_8$ α-olefin, and (c) ethylene and a $C_4-C_8$ α-olefin, the copolymer optionally containing about 0.5% to about 10% by weight of a diene, and containing less than 70% by weight, preferably about 10% to about 60%, most preferably about 12% to about 55%, of ethylene and being soluble in xylene at ambient temperature and having an intrinsic viscosity of about 1.5 to about 4.0 dl/g;

the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages and has a flexural modulus of less than 150 MPa; and (e) a thermoplastic olefin comprising:
  (i) about 10% to about 60%, preferably about 20% to about 50%, of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85;

(ii) about 20% to about 60%, preferably about 30% to about 50%, of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and (iii) about 3% to about 40%, preferably about 10% to about 20%, of a copolymer of ethylene and propylene or a $C_4$–$C_8$ α-olefin that is insoluble in xylene at ambient temperature, wherein the composition has a flexural modulus of greater than 150 but less than 1200 MPa, preferably about 200 to about 1100 MPa, most preferably about 200 to about 1000 MPa.

Room or ambient temperature is ~25° C.

The $C_{4-8}$ α-olefins useful in the preparation of (d) and (e) include, for example, butene-1; pentene-1; hexene-1; 4-methyl-1-pentene, and octene-1.

The diene, when present, is typically a butadiene; 1,4-hexadiene; 1,5-hexadiene, or ethylidenenorbornene.

The preparation of propylene polymer material (d) is described in more detail in U.S. Pat. Nos. 5,212,246 and 5,409,992, the preparation of which is incorporated herein by reference. The preparation of propylene polymer material (e) is described in more detail in U.S. Pat. Nos. 5,302,454 and 5,409,992, the preparation of which is incorporated herein by reference.

The monomers that can be graft polymerized onto the propylene polymer material backbone can be any monomeric vinyl compound capable of being polymerized by free radicals wherein the vinyl radical, $H_2C$=$CR$—, in which R is H or methyl, is attached to a straight or branched aliphatic chain or to a substituted or unsubstituted aromatic, heterocyclic, or alicyclic ring in a mono- or polycyclic compound. Typical substituent groups can be alkyl, hydroxyalkyl, aryl, and halo. Usually the vinyl monomer will be a member of one of the following classes: (1) vinyl-substituted aromatic, heterocyclic, or alicyclic compounds, including styrene, vinylnaphthalene, vinylpyridine, vinylpyrrolidone, vinylcarbazole, and homologs thereof, e.g., alpha- and -para-methylstyrene, methylchlorostyrene, p-tert-butylstyrene, methylvinylpyridine, and ethylvinylpyridine; (2) vinyl esters of aromatic and saturated aliphatic carboxylic acids, including vinyl formate, vinyl acetate, vinyl chloroacetate, vinyl cyanoacetate, vinyl propionate, and vinyl benzoate; and (3) unsaturated aliphatic nitriles and carboxylic acids and their derivatives, including acrylonitrile, methacrylonitrile, acrylamide, methacrylamide; acrylic acid and acrylate esters, such as the methyl, ethyl, hydroxyethyl, 2-ethylhexyl, and butyl acrylate esters; methacrylic acid, ethacrylic acid, and methacrylate esters, such as the methyl, ethyl, butyl benzyl, phenylethyl, phenoxyethyl, epoxypropyl, and hydroxypropyl methacrylate esters; maleic anhydride, and N-phenyl maleimide. Free radical-polymerizable dienes, such as butadiene, isoprene and their derivatives, can also be used. Multiple monomers from the same or different classes can be employed. Styrene and methyl methacrylate are the preferred grafting monomers.

The monomers are added in an amount of from about 5 parts to about 240 parts per hundred parts of the propylene polymer material, preferably about 20 to about 100 pph.

The graft copolymer is made by forming active grafting sites on the propylene polymer material by treatment with a peroxide or other chemical compound that is a free radical polymerization initiator. The free radicals produced on the polymer as a result of the chemical treatment initiate the polymerization of the monomers at these sites.

During the graft polymerization, the monomers also polymerize to form a certain amount of free or ungrafted polymer or copolymer. The morphology of the graft copolymer is such that the propylene polymer material is the continuous or matrix phase, and the polymerized monomers, both grafted and ungrafted, are a dispersed phase.

The treatment of the polymer with the initiator and with the grafting monomer is carried out in a substantially non-oxidizing atmosphere, as are the subsequent steps of the process. The expression "substantially non-oxidizing", when used to describe the environment or atmosphere to which the propylene polymer material is exposed, means an environment in which the active oxygen concentration, i.e., the concentration of oxygen in a form that will react with the free radicals in the polymer material, is less than about 15%, preferably less than about 5%, and most preferably less than about 1% by volume. The most preferred concentration of active oxygen is 0.004% or lower by volume. Within these limits, the non-oxidizing atmosphere can be any gas, or mixture of gases, that is oxidatively inert toward the free radicals in the olefin polymer material, e.g., inert gases such as nitrogen, argon, helium, and carbon dioxide.

Preparation of graft copolymers by contacting the propylene polymer material with a free radical polymerization initiator such as an organic peroxide and a vinyl monomer is described in more detail in U.S. Pat. No. 5,140,074, the preparation of which is incorporated herein by reference.

In the process of this invention the treatment of the propylene polymer material with the free radical polymerization initiator and the vinyl monomer is carried out in the presence of a continuous feed of nitric oxide in an inert gas, which is added as a separate feed stream, to reduce reactor fouling. Best results are achieved when about 0.05 parts to about 50 parts, preferably about 0.1 parts to about 10 parts, and most preferably about 0.2 parts to about 2 parts of nitric oxide per million parts of the inert gas are used. Any gas, or mixture of gases, that is oxidatively inert toward the free radicals in the propylene polymer material can be used, e.g., nitrogen, argon, helium, and carbon dioxide. The use of nitric oxide gas in the reaction without continuous feed does not produce a significant decrease in reactor fouling.

The use of nitric oxide as a gas phase free radical scavenger is very useful for local protection from the deposition of polymer on polymerization equipment such as blowers, rupture disks, and vent stacks, and will therefore greatly increase the operability and productivity of a commercial plant.

The porosity of the propylene homopolymer used as the backbone polymer in the manufacture of the graft copolymers in the examples is measured as described in Winslow, N. M. and Shapiro, J. J., "An Instrument for the Measurement of Pore-Size Distribution by Mercury Penetration," ASTM Bull., TP 49, 39–44 (Feb. 1959), and Rootare, H. M., "A Review of Mercury Porosimetry," 225–252 (In Hirshhom, J. S. and Roll, K. H., Eds., *Advanced Experimental Techniques in Powder Metallurgy*, Plenum Press, New York, 1970).

In this specification, all parts and percentages are by weight unless otherwise noted.

EXAMPLES 1–4, COMPARATIVE EXAMPLES 1–5

These examples describe the effect on reactor fouling of using a continuous feed of nitric oxide during a graft polymerization reaction, compared to the discontinuous addition of nitric oxide, or no nitric oxide at all. The graft copolymer was made from a propylene homopolymer as the backbone polymer, to which was grafted polystyrene.

In this and the following examples the propylene homopolymer used as the backbone of the graft copolymer had the following properties: spherical form, melt flow rate (MFR) of 9 g/10 min (ASTM D-1238, 230° C., 2.16 kg), a porosity of 0.46 cm$^3$/g, and a weight average molecular weight ($M_w$) of 170,000.

The styrene monomer was grafted onto the polypropylene backbone at a grafting temperature of 110° C. using the previously described peroxide-initiated graft polymerization process, wherein the initiator and monomer are sprayed onto polypropylene particles that have been heated to the reaction temperature in a 1 liter glass gas mixed reactor. Seventy parts by weight of styrene were added per 100 parts of polypropylene. Lupersol PMS 50% t-butylperoxy-2-ethyl hexanoate in mineral spirits, commercially available from Elf Atochem, was used as the peroxide initiator. The grafting monomer was fed at a rate of l pph/min, and a monomer to initiator molar ratio of 105 was used.

In order to quantify the degree of reactor fouling, a "test coupon", an in-line filter basket containing 10 g of propylene homopolymer spheres, was placed in the gas recirculation stream. The % increase in weight of the test coupon during the reaction was an indication of the extent of reactor fouling. The greater the weight increase, the more reactor fouling occurred.

Nitric oxide (NO) in nitrogen was introduced as a separate feed stream and the amount of NO is expressed as parts per million parts of nitrogen in Table 1. The temperature of the test coupon, the % weight increase of the coupon, and the % conversion of monomer to polymer are also shown in the table. The term "make-up gas" in Comparative Examples 4 and 5 refers to the fact that nitric oxide gas is added only at the beginning of the reaction through a make-up gas line.

In Comparative Examples 1–3, no NO was added during the reaction. In Comparative Examples 4 and 5, the system was purged with NO in $N_2$, and the flow of NO was cut off at the beginning of the reaction, since the system pressure increases with monomer addition. In Example 1, the coupon temperature was kept at 97° C., whereas in Example 2, the coupon temperature was kept at 110° C., which was the reaction temperature. In Example 3, the flow rate of NO in nitrogen was 0.2 standard liter (STDL) per minute. In Example 4, the flow rate was increased to 0.4 STDL/min, while the NO concentration remained the same.

TABLE 1

| Example | Inhibitor | Coupon Temp (°C.) | Weight Increase (%) | Conversion (%) | Flow Rate, NO (STDL/min) | NO Concentration In The Reactor (ppm) |
|---|---|---|---|---|---|---|
| Comp. 1 | — | 110 | 35.4 | 83.0 | | |
| Comp. 2 | — | 110 | 38.8 | 82.8 | | |
| Comp. 3 | — | 120 | 43.1 | 87.1 | | |
| Comp. 4 | 200 ppm Nitric oxide 2 psi make-up gas | 110 | 36.2 | 80.7 | | |
| Comp. 5 | 200 ppm Nitric oxide 4 psi make-up gas | 116 | 35.7 | 72.5 | | |
| 1 | 200 ppm Nitric oxide continuous feed | 97 | 16.4 | 79.9 | | 0.2 |
| 2 | 200 ppm Nitric oxide continuous feed | 110 | 18.8 | 80.5 | | 0.2 |
| 3 | 500 ppm Nitric oxide continuous feed | 110 | 2.9 | 87.1 | 0.2 | 0.6 |
| 4 | 500 ppm Nitric oxide continuous feed | 110 | 2.5 | 78.6 | 0.4 | 1.2 |

The data show that there is significantly less coupon weight increase, which indicates that there is less reactor fouling, when a continuous feed of NO is used during the reaction (2.5% and 2.9% vs 35.4%–43.1%), while the conversion of monomer to polymer is comparable to that of the comparative examples. The examples and comparative examples show that fouling increases with temperature. Examples 1–4 show that fouling decreases as the concentration of NO is increased. Although the % weight increase remained approximately the same when the flow rate was increased from 0.2 to 0.4 STDL/min with the same concentration of NO, the % conversion of monomer to polymer decreased slightly at the higher flow rate.

EXAMPLES 5–7; COMPARATIVE EXAMPLES 6–7

These examples describe the effect on reactor fouling of using a continuous feed of nitric oxide during a graft polymerization reaction, compared to using no nitric oxide at all. A larger reactor was used than in Example 1. Nitric oxide in nitrogen was added as a separate feed stream and the amount of NO is expressed as parts per million parts of nitrogen in Table 2. The graft copolymer was made from a propylene homopolymer as the backbone polymer, to which was grafted polystyrene.

The graft copolymer was prepared as described in Example 1, except that a two gallon metal gas mixed reactor was used, 45 parts of styrene were added per hundred parts of polypropylene, and the polymerization temperature was 120° C. The styrene feed rate; the ppm NO added to the system; the % weight increase of the test coupon; the $M_w$, the number average molecular weight ($M_n$) and the molecular weight distribution (MWD; $M_w/M_n$) of the ungrafted polystyrene; the grafting efficiency, and the % conversion of monomer to polymer for each experiment are shown in Table 2. The molecular weight measurements were made by gel permeation chromatography.

TABLE 2

| Example | Styrene Feed Rate (pph/min) | NO Added (ppm) | Weight Increase (%) | $M_w$ | $M_n$ | MWD | Grafting Eff. (%) | Conversion (%) |
|---|---|---|---|---|---|---|---|---|
| Control 6 | 1 | 0 | 36.0 | 382,000 | 86,000 | 4.4 | ~31 | 86.4 |
| Control 7 | 1 | 0 | 27.2 | 319,000 | 83,000 | 3.9 | ~36 | — |
| 5 | 1 | 0.5 | 12.3 | 333,000 | 73,000 | 4.6 | ~44 | 84.4 |
| 6 | 1 | 0.5 | 11.7 | 321,000 | 76,000 | 4.2 | ~36 | 82.2 |
| 7 | 1 | 0.75 | 8.6 | 327,000 | 67,000 | 4.9 | ~48 | 76.9 |

The data show that the % weight increase of the test coupon significantly decreased to 8.6 to 12.3%, depending on the concentration of NO, compared to 27.2 to 36.0% without NO. The amount of fouling decreased when the amount of NO added was increased. The continuous feed of NO did not change the molecular weight or MWD of the polymerized styrene monomer significantly, indicating that NO does not act as a chain transfer agent.

EXAMPLE 8 AND COMPARATIVE EXAMPLE 8

These examples describe the effect on reactor fouling of using a continuous feed of nitric oxide during a graft polymerization reaction, compared to using no nitric oxide at all. Nitric oxide in nitrogen was added in a separate feed stream and the amount of NO is expressed as parts per million parts of nitrogen in Table 3. The graft copolymer was made from a propylene homopolymer as the backbone polymer, to which was grafted a copolymer of methyl methacrylate and methyl acrylate.

The graft copolymer was prepared as described in Example 1, except that 43.05 parts methyl methacrylate and 1.95 parts methyl acrylate were added per hundred parts of polypropylene, the grafting temperature was 115° C., and the monomer/initiator molar ratio was 120. A two gallon metal gas mixed reactor was used.

The % conversion of monomer to polymer, the % weight increase of the test coupon, the amount of poly(methyl methacrylate) (PMMA) in the product, and the amount of PMMA on the test coupon are given in Table 3.

TABLE 3

| Example | Inhibitor | Conversion (%) | Coupon Weight Increase (%) | Product PMMA (pph) | Coupon PMMA (pph) |
|---|---|---|---|---|---|
| 8 | Nitric oxide, 0.5 ppm | 94.5 | 7.6 | 38.5 | 8.4 |
| Comp.8 | None | 100 | 45.5 | 33.8 | 38.1 |

The data show that there was a significant decrease in the weight gain of the test coupon when the reaction was carried out in the presence of a continuous feed of NO.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. A process for making a graft copolymer comprising, in a substantially non-oxidizing environment:

(a) treating a propylene polymer material with an organic compound that is a free radical polymerization initiator,
   (b) treating the propylene polymer material over a period of time that coincides with or follows (a), with or without overlap, with about 5 to about 240 parts of at least one grafting monomer capable of being polymerized by free radicals, per hundred parts of the propylene polymer material; and
   (c) removing any unreacted grafting monomer from the resulting grafted propylene polymer material, decomposing any unreacted initiator, and deactivating any residual free radicals in the material, wherein (a) and (b) are carried out in the presence of nitric oxide that is added in an inert gas in an amount of about 0.05 parts to about 50 parts of nitric oxide per million parts of the inert gas to reduce reactor fouling.

2. The process of claim 1, wherein the propylene polymer material is selected from the group consisting of:

(a) a crystalline homopolymer of propylene having an isotactic index greater than 80;
   (b) a crystalline random copolymer of propylene and an olefin selected from the group consisting of ethylene and $C_4$–$C_{10}$ α-olefins, provided that when the olefin is ethylene, the maximum polymerized ethylene content is 10% by weight, and when the olefin is a $C_4$–$C_{10}$ α-olefin, the maximum polymerized content thereof is 20% by weight, the copolymer having an isotactic index greater than 85;
   (c) a crystalline random terpolymer of propylene and two olefins selected from the group consisting of ethylene and $C_4$–$C_8$ α-olefins, provided that the maximum polymerized $C_4$–$C_8$ α-olefin content is 20% by weight, and, when ethylene is one of the olefins, the maximum polymerized ethylene content is 5% by weight, the terpolymer having an isotactic index greater than 85;
   (d) an olefin polymer composition comprising:
      (i) about 10 parts to about 60 parts by weight of a crystalline propylene homopolymer having an isotactic index greater than 80, or a crystalline copolymer selected from the group consisting of (a) propylene and ethylene, (b) propylene, ethylene and a $C_4$–$C_8$ α-olefin, and (c) propylene and a $C_4$–$C_8$ α-olefin, the copolymer having a propylene content of more than 85% by weight and an isotactic index greater than 85;
      (ii) about 5 parts to about 25 parts by weight of a copolymer of ethylene and propylene or a $C_4$–$C_8$ α-olefin that is insoluble in xylene at ambient temperature; and (iii) about 30 parts to about 70 parts by weight of an elastomeric copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% by weight of a diene, and containing less than 70% by weight of ethylene and being soluble in xylene at ambient temperature and having an intrinsic viscosity of about 1.5 to about 4.0 dl/g;

the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa; and (e) a thermoplastic olefin comprising:
  (i) about 10% to about 60% of a propylene homopolymer having an isotactic index greater than 80, or a crystalline copolymer selected from the group consisting of (a) ethylene and propylene, (b) ethylene, propylene and a $C_4$–$C_8$ α-olefin, and (c) ethylene and a $C_4$–$C_8$ α-olefin, the copolymer having a propylene content greater than 85% and an isotactic index of greater than 85;
  (ii) about 20% to about 60% of an amorphous copolymer selected from the group consisting of (a) ethylene and propylene, (b) ethylene, propylene, and a $C_4$–$C_8$ α-olefin, and (c) ethylene and a $C_4$–$C_8$ α-olefin, the copolymer optionally containing about 0.5% to about 10% of a diene, and containing less than 70% ethylene and being soluble in xylene at ambient temperature; and
  (iii) about 3% to about 40% of a copolymer of ethylene and propylene or a $C_4$–$C_8$ α-olefin that is insoluble in xylene at ambient temperature, wherein the composition has a flexural modulus of greater than 150 but less than 1200 MPa.

3. The process of claim 2, wherein the propylene polymer material is propylene homopolymer.

4. The process of claim 1, wherein the grafting monomer is selected from the group consisting of vinyl-substituted aromatic, heterocyclic, and alicyclic compounds; unsaturated aliphatic carboxylic acids and derivatives thereof; unsaturated aliphatic nitriles; vinyl esters of aromatic and saturated aliphatic carboxylic acids, and mixtures thereof.

5. The process of claim 4, wherein the grafting monomer is selected from the group consisting of styrene, acrylic acid esters, methacrylic acid esters, and mixtures thereof.

6. The process of claim 1, wherein the amount of nitric oxide used is about 0.1 part to about 10 parts per million parts of an inert gas.

* * * * *